US008880617B2

(12) United States Patent
Mankiewicz

(10) Patent No.: US 8,880,617 B2
(45) Date of Patent: Nov. 4, 2014

(54) METHOD, APPARATUS AND SYSTEM FOR DETECTING UNWANTED DIGITAL CONTENT DELIVERED TO A MAIL BOX

(75) Inventor: Bart Mankiewicz, Toronto (CA)

(73) Assignee: Unwired Planet, LLC, Reno, NV (US)

( * ) Notice: Subject to any disclaimer, the term of this patent is extended or adjusted under 35 U.S.C. 154(b) by 1882 days.

(21) Appl. No.: 11/754,862

(22) Filed: May 29, 2007

(65) Prior Publication Data
US 2008/0301235 A1 Dec. 4, 2008

(51) Int. Cl.
G06F 15/16 (2006.01)
G06Q 10/10 (2012.01)

(52) U.S. Cl.
CPC ................................ *G06Q 10/107* (2013.01)
USPC ........................................................ 709/206

(58) Field of Classification Search
CPC .................................................... G06Q 10/107
USPC ........................................................ 709/206
See application file for complete search history.

(56) References Cited

U.S. PATENT DOCUMENTS

| 6,772,196 | B1 * | 8/2004 | Kirsch et al. | 709/206 |
| 7,321,922 | B2 * | 1/2008 | Zheng et al. | 709/206 |
| 2004/0111531 | A1 * | 6/2004 | Staniford et al. | 709/246 |
| 2005/0071432 | A1 * | 3/2005 | Royston, III | 709/206 |
| 2005/0262208 | A1 * | 11/2005 | Haviv et al. | 709/206 |
| 2006/0149821 | A1 * | 7/2006 | Rajan et al. | 709/206 |

* cited by examiner

*Primary Examiner* — Phuoc Nguyen

(57) ABSTRACT

Email messages stored on a mail server are filtered to identify the email messages that contain unwanted content. The mail server receives incoming email messages over a network. A content filter performs an initial scan to identify the incoming email messages that contain unwanted content by determining whether signatures associated with the email messages are included on a list of signatures that identify email messages that are known to include unwanted content. The email messages that are not identified as containing unwanted content are forwarded to appropriate mail boxes on the mail server. Multiple scanning threads perform a subsequent scan of the email messages in the mail boxes to identify those email messages containing unwanted content that were not identified by the initial scan. The subsequent scan determines whether signatures associated with the email messages in the mail boxes are included in an updated list of the signatures.

17 Claims, 2 Drawing Sheets

METHOD, APPARATUS AND SYSTEM FOR DETECTING UNWANTED DIGITAL CONTENT DELIVERED TO A MAIL BOX

TECHNICAL FIELD

The present invention relates to detecting unwanted digital content delivered to a mail box and, more particularly, to detecting unwanted digital content delivered to a mail box and stored on a mail server before the digital content is downloaded to a client application or device.

BACKGROUND

With the advent of the Internet, email has become prevalent in digital communications. For example, email messages are exchanged on a daily basis to conduct business, to maintain personal contacts, to send and receive files, etc. Unfortunately, undesired email messages have also become prevalent with increased email traffic. Often, these email messages include unsolicited advertisements, which are often referred to as "junk mail" or "spam." In some cases, these email messages contain software viruses that seek to adversely impact computer functions.

Some users may have email accounts that they never use, or use less frequently over time. In accordance with a user agreement, an Internet service provider (ISP) cannot access or close abandoned email accounts until a period of time has passed (e.g., after one year). During that time, the account may be continuously accumulating spam. Because spam messages are often image files or contain attachments that are larger than standard email text files, spam messages tend to consume a disproportionate amount of resources. The ISP is responsible for storing all of the received messages on ISP servers thereby wasting storage system resources and potentially increasing operating costs.

Currently, software applications exist which remove some of the spam or junk mail from a recipient's email account, thereby reducing mail box clutter. Some of these applications remove email messages that contain a particular text string or character(s) or types of content (e.g., large image files) that may indicate that the email message is spam or junk mail. Email messages that are determined to be spam or junk mail are then either removed (e.g., permanently deleted, stored in a recycle bin, etc.) or stored in a designated folder (e.g., "trash" folder, "junk" folder, etc.).

One type of email message filtering application compares a signature associated with an email message to a list of signatures that identify email messages known to include unwanted content (e.g., spam, a virus, etc.). If there is a signature match, the email message containing the unwanted content is discarded. If the signature of the email message does not match a signature in the list (e.g., because the email message has not been identified as including unwanted content), the email message is presumed to be legitimate and is allowed to be stored in the subscriber's mail system inbox.

The algorithms employed to compare a signature associated with an email message to a list of signatures that identify email messages known to include unwanted content are performed on-the-fly (i.e., essentially in real time or near real-time) when the email message enters a gateway or other element coupled to a mail server. However, in some operational situations and with certain types of algorithms, the algorithms may not have enough to time to thoroughly scan each email message. Thus, an email message may not be accurately identified as containing unwanted content before the email message is forwarded to a mail box.

Furthermore, the signature list may not include signatures for all email messages that include unwanted content. For example, a signature may not be included in the signature list because the unwanted content has been recently generated and the signature list has not been updated by the time the email message is sent to the recipient. Thus, an email message that includes unwanted content may be delivered to a recipient's mail box because the signature for that email message is not included in the signature list. The signature list may be subsequently updated to include the signature. However, the email message has already been delivered to a recipient's mail box. Thus, it is too late for the unwanted content to be filtered from the recipient's email account in the usual manner.

Therefore, what is needed is a way to detect unwanted digital content that was not detected by conventional mail or message filters.

SUMMARY OF THE INVENTION

In some embodiments, the present invention is directed to a method of detecting unwanted digital content in a mail box stored on a mail server. Digital content is received at the mail server. A first scan of the digital content is performed at the mail server to determine whether the digital content includes unwanted content. The first scan determines whether a signature associated with the digital content is included in a first list of signatures that identify digital content known to include unwanted content. The digital content is forwarded to a user's mail box. A second scan of the digital content in the mail box is performed to determine whether the digital content includes unwanted content. The second scan determines whether a signature associated with the digital content is included in a second list of signatures that identify digital content known to include unwanted content. The second list of signatures is an updated version of the first list of signatures.

In some embodiments, the present invention is directed to a mail server that includes a content filter and a mail store. The content filter includes a first list of signatures that identify email messages that are known to include unwanted content. The content filter performs a first scan on incoming email messages to determine whether a signature associated with each incoming email message is included on the first list of signatures. The first list of signatures is updated with at least one additional signature to comprise a second list of signatures that identifies email messages that are known to include unwanted content. The mail store includes a plurality of mail boxes for storing the email messages after the first scan is performed. The content filter executes a plurality of scanning threads each performing a second scan on the email messages in a corresponding mail box to determine whether a signature associated with each scanned message is included on the second list of signatures.

In some embodiments, the present invention is directed to a system for filtering email message content in mail boxes stored on a mail server. The system includes means for receiving email messages at the mail server, means for performing a first scan of the email messages to determine which email messages include unwanted content, means for forwarding the email messages to the appropriate mail boxes; and means for performing a second scan of the email messages in the mail boxes to determine which email messages include unwanted content. The first scan is performed by executing a first algorithm to determine whether a signature associated with each email message is included in a first list of signatures that identify email messages known to include unwanted content. The second scan is performed by executing multiple threads.

These and other advantages of the invention will be apparent to those of ordinary skill in the art by reference to the following detailed description and the accompanying drawings.

DETAILED DESCRIPTION OF THE INVENTION

Figure 1:
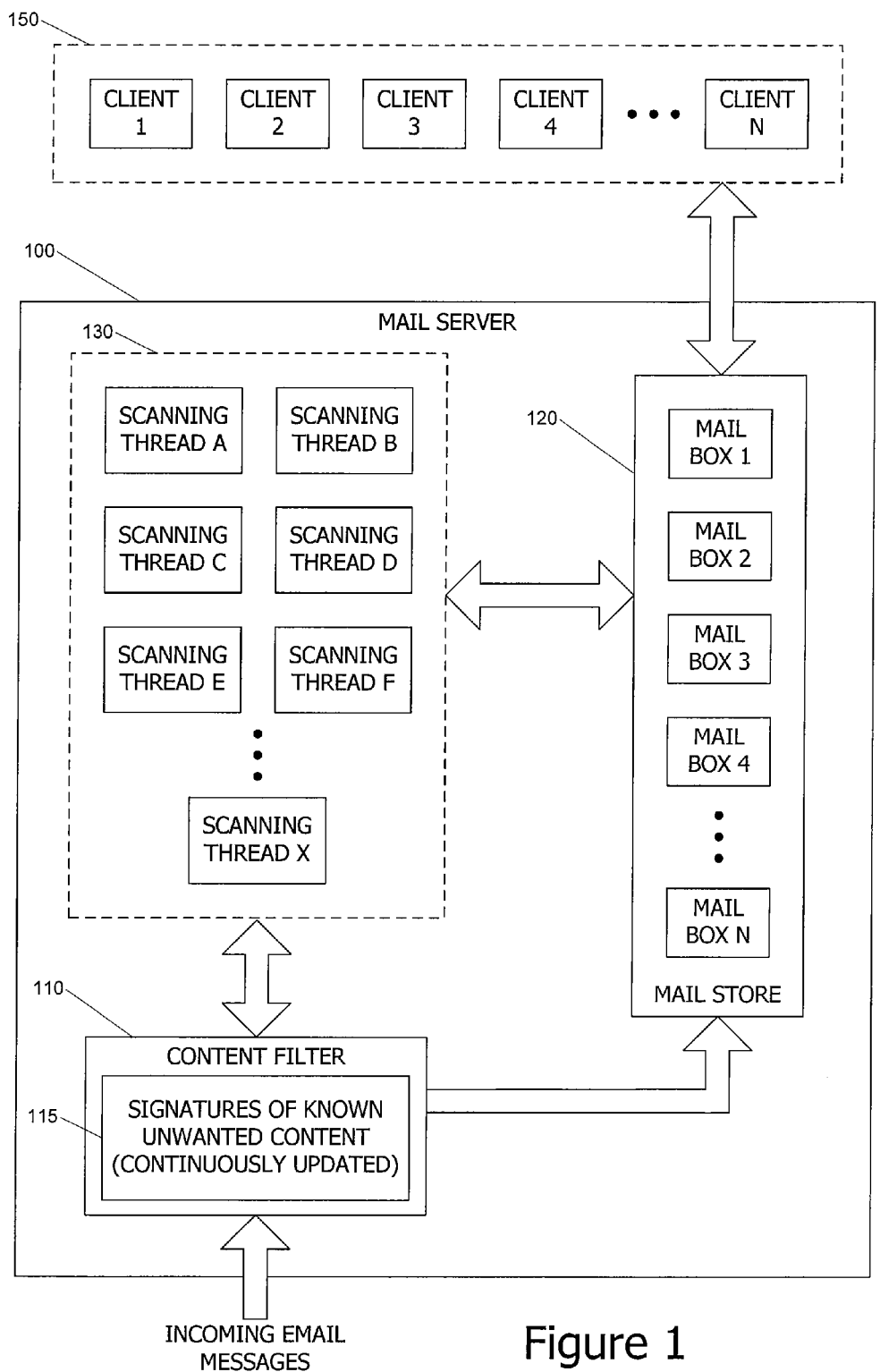
FIG. 1 is a functional block diagram of a system for detecting unwanted email message content in a mail box stored on a mail server in accordance with some embodiments of the present invention.

FIG. 1 is a functional block diagram of a system for detecting unwanted email message content in a mail box stored on a mail server in accordance with some embodiments of the present invention. The system includes a mail server 100 that receives incoming digital content, such as email messages, from other mail servers over a network. The mail server 100 includes a content filter 110 that includes a list of signatures 115 that identify digital content that is known to be, or known to include unwanted content.

When an email message is sent to a subscriber and received at a gateway to the mail server 100 (i.e., before the email message is forwarded the mail store 120), the content server 110 performs an initial scan on the email message to determine whether the email message includes unwanted content. The unwanted content may include spam, a virus or any other junk mail in the form of email message text, images or attachments.

The content filter 110 compares a signature of the incoming email message to the list of signatures 115 that identify email messages, attachments or other forms of content known to include unwanted content. If the signature of the incoming email message corresponds to a signature in the list of signatures 115, the email message is identified as containing unwanted content. If the signature of the incoming email message does not correspond to a signature in the list of signatures 115, the email message is not identified as containing unwanted content. The email messages identified as containing the unwanted content may either be discarded (e.g., permanently deleted, stored in a recycle bin, etc.) or forwarded to a mail store 120 along with the email messages that were not identified as containing unwanted content.

A signature may be created in a variety of ways. For example, a signature may be derived by any combination of the following properties: 1) the presence, absence, or content in the "Received: from mail" line in a sent email message; 2) the presence, absence, or content of a "To:" header; 3) the presence, absence, or content of a "Bcc:" header; 40 the presence, absence, or content of a Content Type header (e.g., Content-Type: TEXT/PLAIN; charset="US-ASCII"); 5) the presence, absence, or content of a Content-Transfer-Encoding header (e.g., Content-Transfer-Encoding: 7 bit); 6) the presence, absence, or content of an "X-Mailer" header; 7) the Return-Path: < > or a "From:" address of several letters, random numbers, or a forged domain; 8) the body of the message contains a URL, or uses a long obfuscated URL to encode a target web site for a reader to follow; and 9) binary attachments (e.g., .GIF, .JPG, .ZIP, .EXE, etc.). One skilled in the art would recognize that other signatures derived from other properties may also be generated and are suitable for use with the present invention.

Although the present invention is described with reference to email messages, one skilled in the art would recognize that the present invention could be used to filter other digital content in addition to email messages. For example, the present invention could be used to detect unwanted pop-up advertisements, and images and video attached to, or not included in or attached to an email message. The content filter 110 identifies patterns in a binary attachment or file. For example, the content filter 110 may identify patterns in a binary attachment by extracting instructions from the machine code of the binary attachment. In other words, a signature may be generated by disassembling a file and creating a signature from sections of the code. The binary signature is then compared to other binary signatures of known unwanted content.

In some cases, an incoming email message containing unwanted content has a signature which is not included in the list of signatures 115 and, therefore, is not detected by the content filter 110 as containing unwanted content. The signature may not be included in the list of signatures because, for example, the email message or related content is too recent for the content filter 110 to be aware of the unwanted content. The email messages that are mistakenly not identified as containing unwanted content are forwarded to the mail store 120. Eventually, the content filter 110 may generate or receive a rule that identifies the email message as containing unwanted content such that a signature associated with the email message is included in the list of signatures 115. However, the email message containing the unwanted content has already been forwarded to the mail store 120 so it has not been detected as containing unwanted content during the scan performed while the message is on the email server.

Due to operational constraints (e.g., the volume of incoming messages, operating conditions of the email system, etc.) the initial scan of each incoming email message may be forced to occur very quickly (i.e., on-the-fly or nearly on-the-fly). Thus, the initial scan may be limited to computationally inexpensive scanning algorithms which may not be capable of efficiently or effectively identifying certain types or forms of unwanted content. In one embodiment, the content filter 110 determines whether the signature of the incoming email message is included in the list of signatures 115 within one hundred milliseconds. Thus, time constraints may lead to some incoming spam messages being mistakenly identified as not containing unwanted content.

The mail store 120 includes multiple mail boxes (1-N). Each mail box is associated with an email subscriber such that an email message that is sent to a subscriber may be stored in the corresponding mail box in the mail store 120. The subscriber may access the email messages in the mail box by downloading the email messages to a client 150 or by accessing the mail server 100 via a web mail application. In some embodiments of the present invention, the mail server 100 executes multiple scanning threads 130 that perform a subsequent scan of the email messages in the mail boxes to identify those email messages containing unwanted content that were not identified by the initial scan, as described in detail below.

After the initial scan of the incoming email messages, the email messages that are not identified as containing unwanted content are delivered to an inbox folder in the corresponding subscriber's mail box in the mail store 120. In one embodiment, the email messages that are identified as containing unwanted content may be discarded (e.g., permanently deleted, forwarded to a recycle bin, etc.). In another embodiment, the email messages that are identified as containing unwanted content are forwarded to the corresponding mail box in the mail store 120 such that the subscriber may still access the email messages. For example, the email messages that are identified as containing unwanted content may be stored in a junk folder in the subscriber's mail box, or otherwise identified as being undesirable (e.g., by "flagging" the message).

After the initial scan of the incoming email messages, the email messages stored in the mail store 120 that have not been identified as containing unwanted content are re-scanned before the email messages are downloaded to the client 150 or otherwise accessed by the subscriber. In some embodiments, this is accomplished by executing a plurality of scanning threads (i.e., a group of executing processes that perform a scanning operation). In some embodiments, each scanning thread accesses the email messages in the inbox folder of a corresponding mail box. The email messages are scanned a second time to identify those email messages that contain unwanted content but which were not identified as such during the initial scan (e.g., because the signature of the email message was not included in the list of signatures 115, or because the scanning process applied was not optimal for identifying certain unwanted content under the operational conditions of the mail system). In some embodiments, all of the scanning threads do not employ the same scanning algorithm to identify those email messages that contain unwanted content. The email messages that have not been previously identified as including unwanted content are provided to the content filter 110 via the scanning threads 130. The content filter 110 determines whether the email messages contain unwanted content using an updated list of signatures 115. The updated list of signatures 115 includes signatures that were not included in the list of signatures 115 during the initial scan. In one embodiment, the mail boxes are scanned periodically (e.g., once every twenty-four hours) to identify any email messages that contain unwanted content but were not identified as such by the initial scan.

The scanning algorithms used during the second scan are more aggressive than the algorithm used during the initial scan. The scanning algorithms used during the second scan may include algorithms which cannot be executed with minimal or no latency, or are in other ways less optimal or undesirable to use as part of the initial scanning process. The scanning algorithms may be more aggressive during the second scan because the second scan is not necessarily performed on-the-fly and, therefore, need not be performed as quickly as the initial scan. The second scan is performed on the email messages stored in the mail boxes, whereas the initial scan is performed when the email messages are at the gateway of the mail server 100.

After an email message is scanned a second time, the email message may be confirmed as not including unwanted content because the corresponding signature is not included in the updated list of signatures 115. The email message is then identified as having been scanned a second time. Thus, in one embodiment, an email message that has been scanned twice and is identified as not containing unwanted content will not be scanned again during subsequent re-scanning procedures by the scanning threads. Furthermore, if execution of a scanning thread is terminated before all of the email messages in the mail box are scanned, a restart of the scanning thread will only scan those email messages that have not been identified as having been re-scanned, thereby expediting the scanning process. In one embodiment, the email message is identified as having been re-scanned using header information associated with the email message. The header information is read by the corresponding scanning thread to determine whether the email message has been evaluated for unwanted content since being delivered to the mail store 120. In one embodiment, the header information includes a bit or a flag that identifies the email message as having been rescanned.

The scanning threads 130 simultaneously access multiple mail boxes in the mail store 120 or multiple email messages in a mail box to efficiently execute the subsequent scanning process. Each scanning thread (A-X) accesses the header information in the email messages in a corresponding mail box to determine whether an email message has been scanned a second time by the content filter 110. If an email message has not been scanned by the content filter 110 after being delivered to the mail store 120, the email message is submitted to the content filter 110. The content filter 110 determines whether the email message includes unwanted content by comparing the signature associated with the email message to the updated list of signatures 115, as described above. If the email message is identified as containing unwanted content, the scanning threads 130 determine what to do with the message based on, for example, user-defined settings, as described below.

In one embodiment, an email message that is identified as containing unwanted content after the second scan is removed from the inbox in the subscriber's mailbox. For example, the email message is discarded (e.g., permanently deleted, forwarded to a recycle bin, etc.). Alternatively, an email message that is identified as containing unwanted content is stored in a junk folder in the subscriber's mail box and the contents of the junk folder may be periodically purged (e.g., after seven days). If there is a email message that was delivered to the junk folder that the subscriber wants to keep, the subscriber can move the email message from the junk folder to the inbox folder of the mail box. Thus, the subscriber may recover email messages that have been identified as including unwanted content. The retrieved message is identified as having been previously scanned in the header information such that subsequent scans of the mail box will not scan the email message retrieved from the junk folder. Thus, a retrieved email message will not be moved back to a junk folder after a subsequent scan because the subscriber did not intend to have the message expunged from the inbox.

In another embodiment, the subject line of the email message that is identified as containing unwanted content is changed to include an unwanted content identifier (e.g., "SPAM:"). A rule can be generated to identify the unwanted content identifier in the subject line of the email message. When such an email message is downloaded to a client 150, the email message is deleted from the mail store 120 or is moved from an inbox folder to a junk folder in the mail box.

Figure 2:
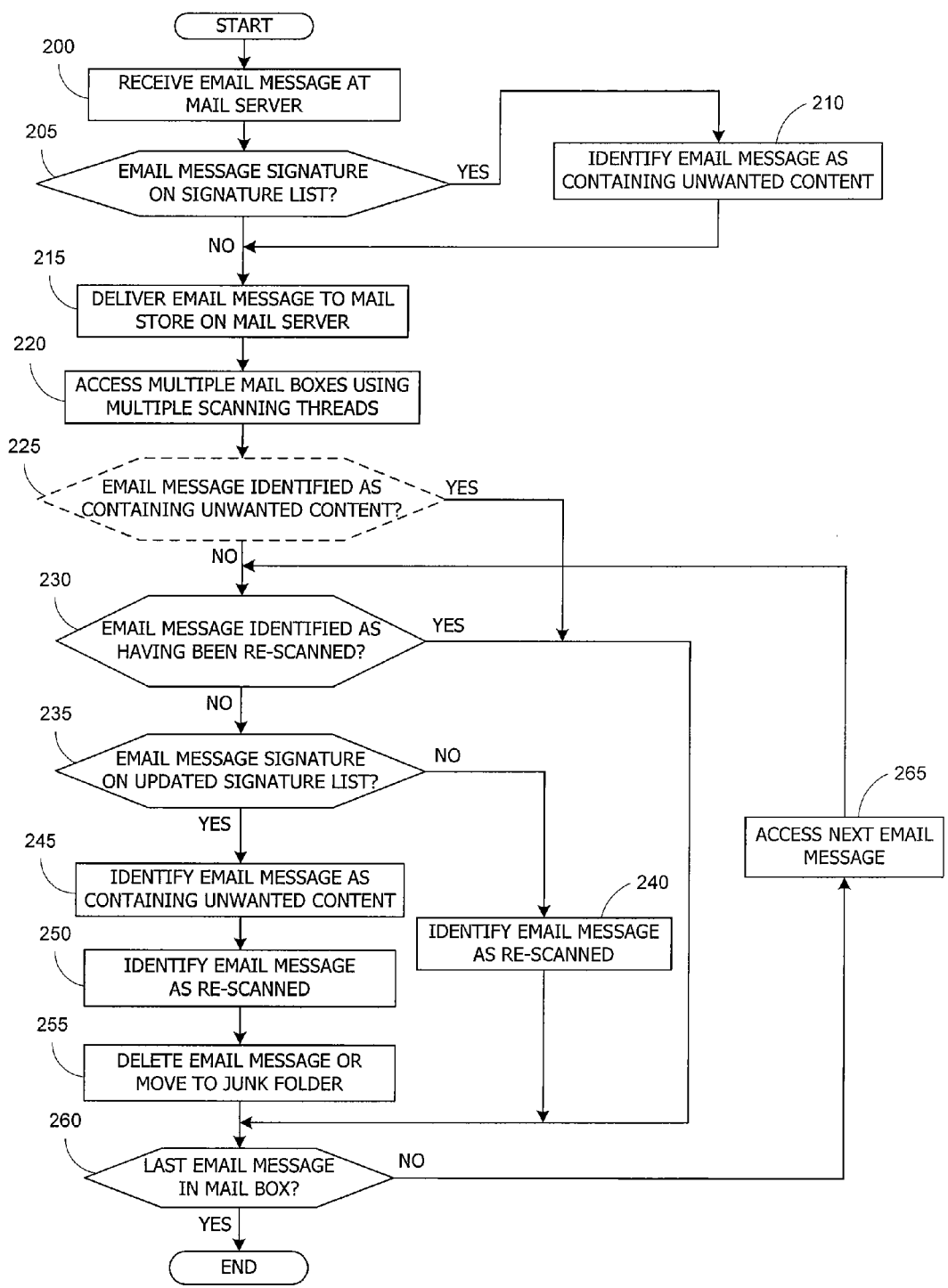
FIG. 2 is a flow diagram illustrating a method for detecting unwanted email message content in a mail box stored on a mail server in accordance with some embodiments of the present invention.

FIG. 2 is a flow diagram illustrating a method for detecting unwanted email message content in a mail box stored on a mail server in accordance with some embodiments of the present invention. The method begins at step 200 where an email message is received at a gateway to a mail server. The email message is received from another mail server over a network. Additional email messages may be received from the same mail server or other mail servers connected to the network.

At step 205, an initial scan of the email message is performed to determine whether a signature associated with the email message is on a signature list that identifies email messages that are known to include unwanted content. The signature list is stored in a content filter. If the signature associated with the email message is not on the signature list, the method continues to step 215. If the signature associated with the email message is on the signature list, the method continues to step 210 where the email message is identified as containing unwanted content, and the method continues to step 215.

At step 215, the email message is delivered to a mail store on the mail server. The mail store includes mail boxes corresponding to each subscriber. The email message is stored in the mail box that corresponds to the subscriber to which the email message is to be sent. If the email message is identified as containing unwanted content, the email message may be stored in a junk folder in the subscriber's mail box. Alternatively, an email message identified as containing unwanted content may be deleted without being stored in the subscriber's mail box. If the email message is not identified as containing unwanted content, the email message may be stored in an inbox folder in the subscriber's mail box.

At step 220, multiple mail boxes in the mail store are accessed simultaneously by multiple scanning threads. Each scanning thread accesses an email message in a mail box to identify any email messages that the content filter may not have recognized as containing unwanted content during the initial scan (e.g., because the email message signature was not included in the signature list, or because the scanning process applied was not optimal for identifying certain unwanted content under the operational conditions of the mail system). The scanning threads are executed to periodically re-scan the email messages in the mail box (e.g., once every twenty-four hours). In some embodiments, each email message may be re-scanned only once. In one embodiment, the scanning threads access email messages not previously identified as containing unwanted content in the inbox folder of the corresponding mail box. In some embodiments, all of the scanning threads do not employ the same algorithm to identify those email messages that contain unwanted content.

In another embodiment, shown in FIG. 2 as optional step 225, the scanning thread accesses all email messages in the mail box (i.e., not just the email messages in the inbox folder) to determine which email messages were previously identified as containing unwanted content. If an email message was previously identified as containing unwanted content, a re-scan of the email message is not necessary because the unwanted content was accurately detected in the initial scan, and the method continues to step 260. If the email message was not previously identified as containing unwanted content, the method continues to step 230.

At step 230, a determination is made whether the email message has already been re-scanned. If the email message is identified as having been re-scanned, a re-scan of the email message is unnecessary in order to expedite the scanning process, and the method continues to step 260. If the email message is not identified as having been re-scanned, the method continues to step 235.

At step 235, a re-scan of the appropriate email messages is performed by determining whether a signature associated with the email message is on the updated signature list that identifies email messages known to include unwanted content, as described above. The re-scan of the email messages is necessary to identify those email messages that contain unwanted content but were not accurately identified as containing unwanted content during the initial scan (e.g., because the corresponding signature was not included in the signature list, or because the scanning process applied was not optimal for identifying certain unwanted content under the operational conditions of the mail system). If the signature associated with the email message is on the updated signature list, the method continues to step 245. If the signature associated with the email message is not on the updated signature list, the method continues to step 240 where the email message is identified as having been re-scanned, and the method then continues to step 260.

At step 245, the email message is identified as containing unwanted content. The accurate identification of the email message as containing unwanted content compensates for the misidentification during the initial scan. The accurate identification may be due to, for example, the signature of the email message being added to the list of signatures in the content filter after the initial scan but before the subsequent scan. The accurate identification may also be due to the use of more effective algorithms that were not employed to perform the initial scan.

At step 250, the email message is identified as being re-scanned. Identifying the email message as being re-scanned expedites the scanning process because subsequent scans of the mail box will not evaluate an email message identified as having been already re-scanned for unwanted content.

At step 255, the email message that contains unwanted content is removed from the inbox in the subscriber's mail box. In one embodiment, the email message is deleted from the subscriber's mail box. In another embodiment, the email message is moved to a junk folder in the subscriber's mail box. The junk folder may be periodically purged to increase available storage space without any user action. One having ordinary skill in the art would understand that the email message could be handled in other ways based on, for example, user-defined settings.

At step 260, a determination is made whether the email message is the last message in the subscriber's mail box. If the email message is not the last message in the subscriber's mail box, the method continues to step 265 where the scanning thread accesses the next email message in the subscriber's mail box that has not yet been re-scanned to determine whether that email message contains unwanted content. If the email message is the last message in the subscriber's mail box, the scanning threads are done evaluating the email messages in the subscriber's mail box, and the method then terminates at an end block.

As is apparent from the above description, unwanted digital content is filtered by separating unwanted content from wanted content after email messages are received in a mail box on a mail server but before the email messages have been downloaded from the mail server to a client or otherwise accessed by a subscriber. The subscriber can access the filtered contents of the mail box by downloading the email messages to a client or by accessing the mail box via a web mail application. By scanning a mail box for email messages containing unwanted content after an initial scan at a mail server gateway, the volume of messages required to be stored by an ISP can be reduced thereby increasing available storage space.

The present invention has been described in terms of specific embodiments. As will be understood by those skilled in the art, the embodiments illustrated above may be modified, altered, and changed without departing from the scope of the present invention. The scope of the present invention is defined by the appended claims.

What is claimed is:
1. A method for detecting unwanted digital content in a mail box stored on a mail server, the method comprising:
receiving digital content at the mail server;
performing a first scan of the digital content to determine whether the digital content includes unwanted content, wherein the first scan determines whether a signature associated with the digital content is included in a first list of signatures that identify digital content known to include unwanted content;

forwarding the digital content to the mail box; and performing a second scan of the digital content in the mail box to determine whether the digital content includes unwanted content, wherein the second scan determines whether the signature associated with the digital content is included in a second list of signatures that identify digital content known to include unwanted content, the second list of signatures being an updated version of the first list of signatures.

2. The method of claim 1 wherein the digital content is an email message.

3. The method of claim 1 wherein the second list of signatures includes the first list of signatures and at least one additional signature.

4. The method of claim 1 further comprising:

in the event that the signature associated with the digital content is included in the first list of signatures, identifying the digital content as including unwanted content.

5. The method of claim 1 further comprising:

in the event that the signature associated with the digital content is included in the second list of signatures, identifying the digital content as including unwanted content.

6. The method of claim 1 further comprising:

in the event that the digital content is determined to include unwanted content by the second scan, discarding the digital content.

7. The method of claim 1 wherein:

in the event that the digital content is determined to not include unwanted content by the first scan, forwarding the digital content to an inbox folder in the mail box, and in the event that the digital content is determined to include unwanted content by the second scan, moving the digital content from the inbox folder to a junk folder in the mail box.

8. The method of claim 7 further comprising:

purging the digital content from the junk folder after a predetermined time period has elapsed.

9. The method of claim 1 further comprising:

executing a first scanning thread to perform the second scan, wherein the first scanning thread performs the second scan on other digital content in the mail box by executing a first algorithm.

10. The method of claim 9 further comprising:

executing a second scanning thread that performs a scan of other digital content in another mail box by executing a second algorithm, wherein the second scanning thread executes substantially simultaneously as the first scanning thread.

11. The method of claim 1 further comprising:

identifying the digital content as having been re-scanned after the second scan is performed, wherein a subsequent scan will not be performed on the digital content identified as having been re-scanned.

12. A mail server comprising:

a content filter comprising a first list of signatures that identifies email messages that are known to include unwanted content, wherein the content filter performs a first scan on incoming email messages to determine whether a signature associated with each incoming email message is included on the first list of signatures, the first list of signatures being updated with at least one additional signature to comprise a second list of signatures that identifies email messages that are known to include unwanted content; and a mail store comprising a plurality of mail boxes for storing the email messages after the first scan is performed, wherein the content filter executes a plurality of scanning threads each performing a second scan on the email messages in a corresponding mail box to determine whether a signature associated with each scanned email message is included on the second list of signatures.

13. The mail server of claim 12 wherein:

in the event that the first scan determines that a signature associated with an email message is not included in the first list of signatures, the email message is stored in an inbox folder of the corresponding mail box, and in the event that the second scan determines that the signature associated with the email message is included in the second list of signatures, the email message is moved from the inbox folder to a junk folder of the corresponding mail box.

14. The mail server of claim 12 wherein in the event that the second scan determines that the signature associated with the email message is included in the second list of signatures, the email message is discarded.

15. The mail server of claim 12 wherein an email message is identified as having been re-scanned after the second scan is performed such that a subsequent scan will not be performed on the email message identified as having been re-scanned.

16. The mail server of claim 12 wherein at least two scanning threads are executed substantially simultaneously.

17. The mail server of claim 12 wherein the plurality of scanning threads each perform the second scan by an executing algorithm, the plurality of scanning threads not all executing the same algorithm.

* * * * *